Figure 1:
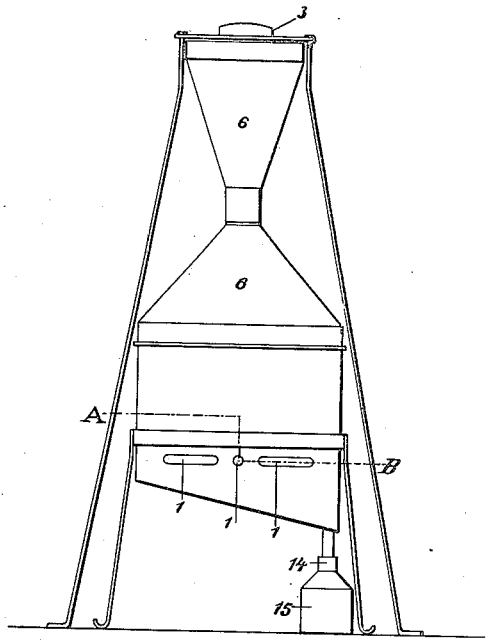

R. P. VAN CALCAR, J. ELLERMAN & H. J. MARTIJN.
PROCESS FOR DRYING AND STERILIZING AIR.
APPLICATION FILED DEC. 29, 1911.

1,203,941.

Patented Nov. 7, 1916.

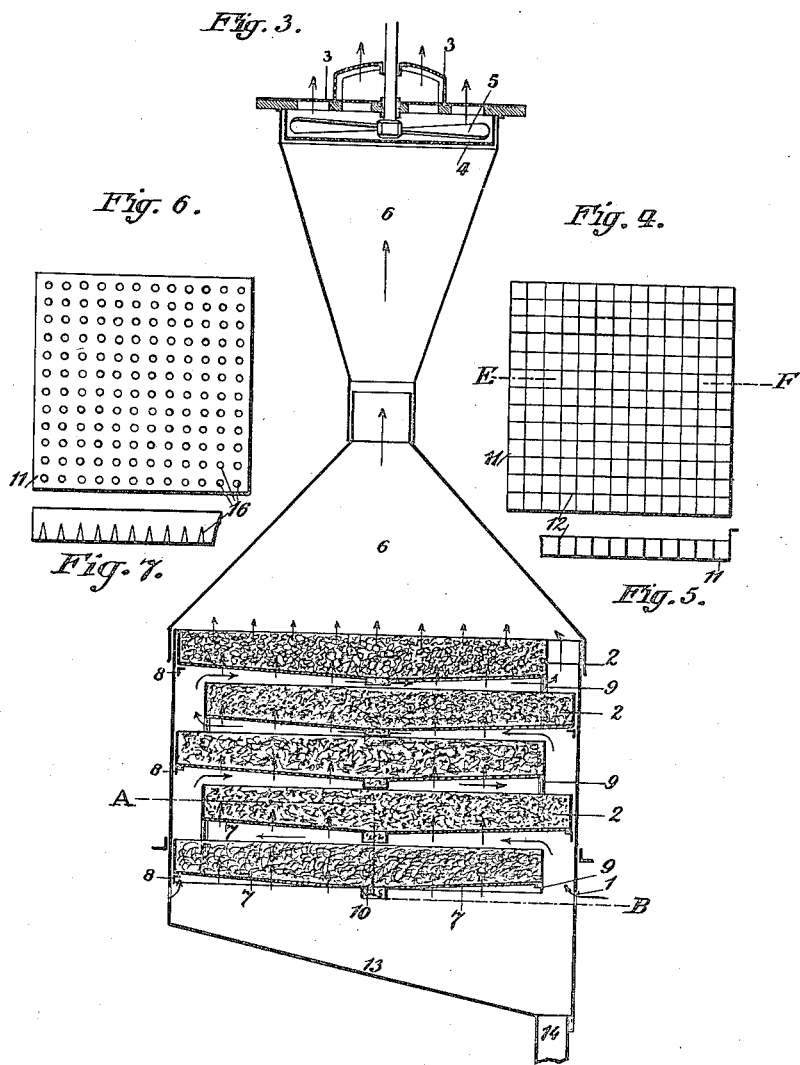

UNITED STATES PATENT OFFICE.

REINDER PIETERS van CALCAR, OF OEGSTGEEST, AND JAN ELLERMAN AND HENDRIKUS JOHANNES MARTIJN, OF THE HAGUE, NETHERLANDS.

PROCESS FOR DRYING AND STERILIZING AIR.

1,203,941. Specification of Letters Patent. Patented Nov. 7, 1916.

Application filed December 29, 1911. Serial No. 668,474.

*To all whom it may concern:*

Be it known that we, REINDER PIETERS VAN CALCAR, professor, JAN ELLERMAN, banker, and HENDRIKUS JOHANNES MARTIJN, banker, residing, the former in the city of Oegstgeest, in the Kingdom of the Netherlands, and the last two in the city of The Hague, in the Kingdom of the Netherlands, have invented certain new and useful Improvements in Processes for Drying and Sterilizing Air, of which the following is a specification.

It is of importance for many industrial and other purposes to have in closed rooms completely dry and as far as possible completely sterilized air and to be able to produce this as it is required.

It is for instance absolutely necessary for drying rooms that the air contained in them should show as small a moisture-content as possible; and it is furthermore of great importance in newly erected buildings that moisture in rooms, occasioned by bricks laid while wet and by the sweating of lime, should be removed as soon as possible. In operating rooms it should be stipulated that the air should not be too damp and furthermore that all dust and impurities should be removed from it.

Attempts have previously been made to produce dry air in closed rooms by heating the rooms in question with or without natural or artificial ventilation, but it is generally known that by the processes hitherto employed this object has been attained only to a very incomplete extent. These processes are very exacting and costly and have many defects inseparable from them, and that in consequence of the unavoidable entrance of fresh, damp air in methods and processes hitherto known there can naturally be no question of sterilization.

By way of illustration there may be mentioned as one of the defects the fact that the customary heating and ventilating of store rooms has a very disadvantageous effect on the stock, e. g. of cigars and other goods, which are easily damaged under the action of heat and dampness. In the case of cigars for instance, this is a considerable disadvantage, as the aroma is to a certain extent lost.

By the previously known methods of working the desired object is not attained and by their means the aqueous vapor and impurities in air are not separated from it at all, or only to a very slight extent. The contrary result is really achieved as by heating the capacity of air to take up aqueous vapor is merely increased, and by ventilation the air saturated with aqueous vapor is certainly removed but only to be replaced by damp, fresh air. The sterilizing of air in closed rooms has not hitherto been attempted.

The object of the present invention is to obviate these defects by subjecting the air in closed rooms provided with means for preventing the ingress of fresh atmospheric air to such treatment that the air itself is freed from all aqueous vapor and impurities and a completely dry and pure air is produced. This object is attained by the damp air in a closed room being subjected in a continuous process to drying and simultaneous or subsequent sterilization. This is effected by subjecting the air, for the purpose of drying it, to the action of a substance which itself absorbs moisture and preventing the ingress of fresh atmospheric air. Furthermore, the solution which results from the absorption of moisture by the drying agent is preferably employed for the sterilization of the previously dried air by the solution being allowed to drop downward in a counter current on to the air as it rises, in such a way that the air is intimately permeated on all sides by the dissolved drying material falling as a fine spray. In the execution of this process calcium chlorid is preferably employed as a drying agent as this substance affords special advantages in its use. Consequently the air in a closed room is subjected to the influence, for example, of calcium chlorid which absorbs all the aqueous vapor contained in the air. The water of condensation formed in this way and taken up by the drying agent or absorbing material partially dissolves the same and the solution formed takes up the impurities contained in the air.

In accordance with the present invention therefore on the one hand a completely dry and pure air is produced, and on the other hand a solution of the drying agent or absorption medium in water is obtained from which after previous filtration the absorbing material can be recovered by evaporation and again obtained for renewed use.

In the annexed drawings an apparatus for executing the process is illustrated.

Figure 2:
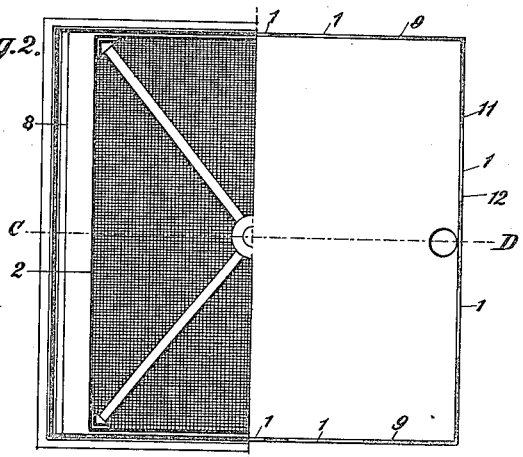

Figure 1 gives a side view of the apparatus. Fig. 2 a horizontal section along the line A—B in Fig. 3. Fig. 3 a vertical section along the line C—D in Fig. 2. Fig. 4 a top view of the evaporating pan. Fig. 5 a vertical section along the line E—F in Fig. 4. Fig. 6 shows in plan a modified form of the evaporating pan; and Fig. 7 shows in vertical transverse section the modified form of evaporating pan illustrated in plan in Fig. 6.

In the practical execution of the process the damp air is conducted over and through chambers 2 arranged one above the other and filled with the absorbing material, while for the sake of expediting the process the current is preferably strengthened by artificial forcing or suction. Moreover for the production of as energetic a drying effect as possible in the absorbing material it is advisable for the latter to be in a granular condition and to provide the pans with perforated or sieve bottoms. Owing to the bottoms of the pans having perforations the damp air passes not only over but also through the granular absorbing material and the drying effect of the latter becomes intensified, while on the other hand the solution of the absorbing material which is formed drops from the upper onto the lower pans and finally collects in the lowest pan and can be drawn off from there. In this way therefore the solution is conducted against the current of air on the counter-current principle and takes up the impurities from the air since the aqueous vapor has already been condensed.

As already explained the solution of the drying agent or absorbing material may be drawn off from the lowest pan and after filtration may be recovered by evaporation. Experiments undertaken by the applicants have however shown that when calcium chlorid is used as the drying agent or absorbing material it forms cakes in the evaporating pan upon evaporation, which cakes adhere to the walls of the pan and when separated are not easily granulated. By a series of experiments the applicants have succeeded in obviating this inconvenience by making a small addition to the calcium chlorid of such substances as do not influence the absorbent effect of the calcium chlorid but have also an absorbent effect themselves. These substances are sodium sulfate and copper sulfate, the presence of which facilitates the removal of the calcium chlorid from the evaporating pan.

Furthermore in order to avoid having to granulate the recovered calcium chlorid the applicants subdivide the evaporating pans by means of pins or points 16 affixed to the bottom thereof or by means of vertical partition walls 12 whereby the cakes are made to fall to pieces in small fragments when they are removed from the pans.

What we claim is:

1. A process for drying and sterilizing air, which consists in directing the air upwardly through a suitable soluble drying substance arranged in distinct substantially horizontal layers, thus commingling the substance with the moist air to be dried, the resulting solution in a finely divided state falling through the layers in a direction opposite to that in which flows the current of air to be dried.

2. A process for drying and sterilizing air, which consists in directing the air upwardly through a suitable soluble drying substance and an anti-hardening material in distinct substantially horizontal layers, thus commingling the substance and material with the moist air to be dried, the resulting solution in a finely divided state falling through the layers in a direction opposite to that in which flows the air to be dried, and evaporating the solution and thereby recovering the mixture.

In testimony whereof we have affixed our signatures in presence of two witnesses.

REINDER PIETERS van CALCAR.
JAN ELLERMAN.
HENDRIKUS JOHANNES MARTIJN.

Witnesses:
  I. I. HELSDON RIX,
  EDWARD C. SPERRY.